(12) United States Patent
Keskin

(10) Patent No.: US 12,517,563 B2
(45) Date of Patent: Jan. 6, 2026

(54) TIME-WINDOWED HEATMAPS IN MOBILE APPLICATIONS

(71) Applicant: QUALCOMM Incorporated, San Diego, CA (US)

(72) Inventor: Mustafa Keskin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 18/641,096

(22) Filed: Apr. 19, 2024

(65) Prior Publication Data

US 2025/0328176 A1    Oct. 23, 2025

(51) Int. Cl.
*G06F 1/26*      (2006.01)
*G01K 3/10*      (2006.01)
*G06T 11/20*     (2006.01)

(52) U.S. Cl.
CPC ............. *G06F 1/26* (2013.01); *G01K 3/10* (2013.01); *G06T 11/206* (2013.01)

(58) Field of Classification Search
CPC ............ G06F 1/26; G01K 3/10; G06T 11/206
See application file for complete search history.

(56) References Cited

U.S. PATENT DOCUMENTS

| | | | | |
|---|---|---|---|---|
| 9,983,557 | B2* | 5/2018 | Park | G06F 1/206 |
| 2009/0296769 | A1* | 12/2009 | Fiennes | G01K 15/005 |
| | | | | 374/1 |
| 2017/0083065 | A1* | 3/2017 | Huang | G06F 1/206 |
| 2024/0329722 | A1* | 10/2024 | Dahiya | G06F 1/3228 |

* cited by examiner

*Primary Examiner* — Terrell S Johnson
(74) *Attorney, Agent, or Firm* — QUALCOMM Incorporated

(57) ABSTRACT

In some aspects, a device may receive a plurality of temperature measurements from a plurality of sensors of the device. The plurality of temperature measurements may indicate a temperature of one or more components of the device during a time window. The device may determine, based at least in part on the plurality of temperature measurements, an acceleration and a rate at which the temperature of the device changes during the time window. The device may perform one or more actions based at least in part on the acceleration and the rate at which the temperature of the device changes during the time window. Numerous other aspects are described.

20 Claims, 9 Drawing Sheets

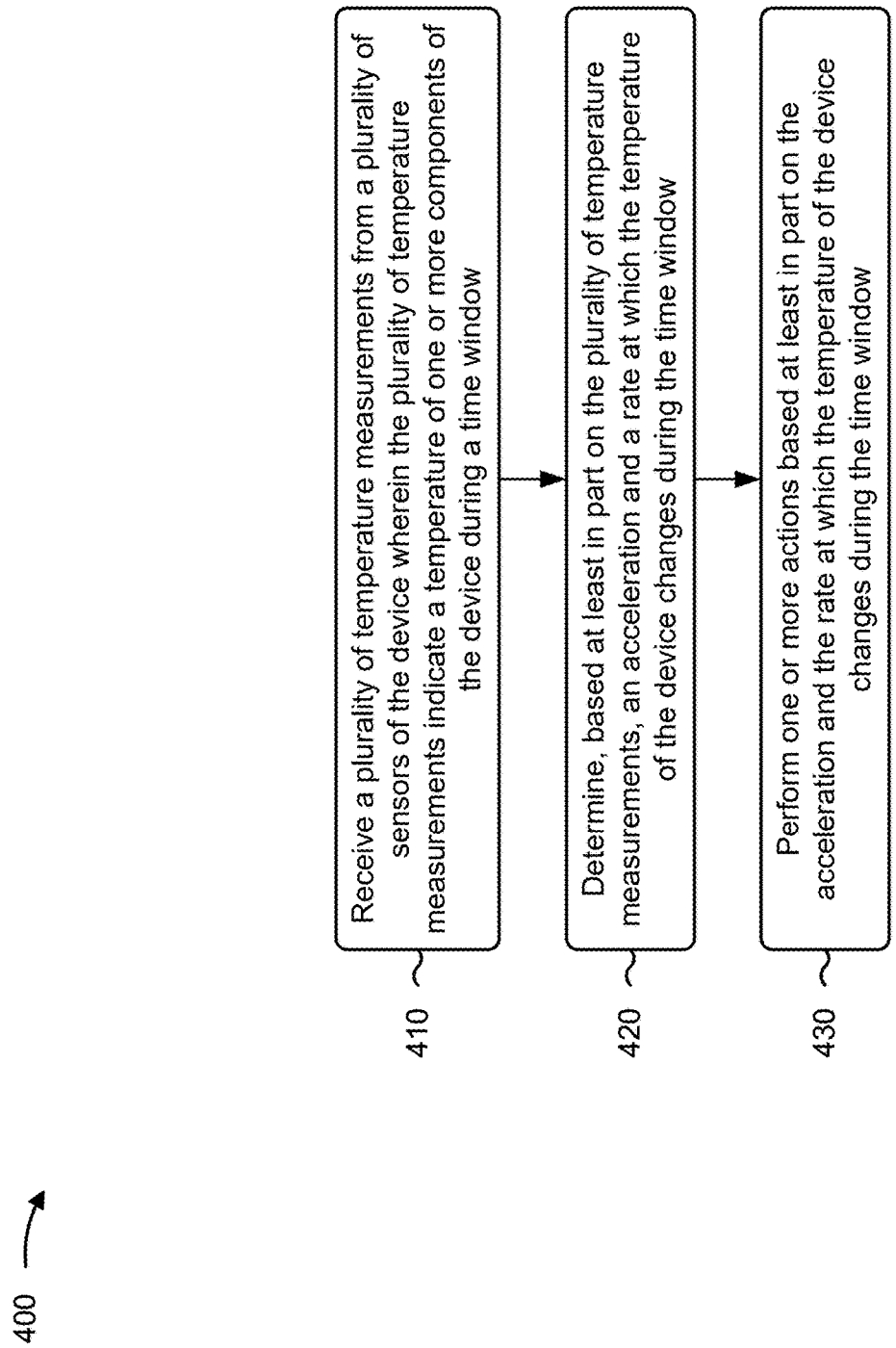

TIME-WINDOWED HEATMAPS IN MOBILE APPLICATIONS

FIELD OF THE DISCLOSURE

Aspects of the present disclosure generally relate to wireless communication and, for example, to a heatmap for time-windowed heatmaps in mobile applications.

BACKGROUND

A heatmap is a two-dimensional data visualization technique that represents a magnitude of individual values within a dataset as a color. The variation in color may represent a relative intensity of the magnitude of the individual values within the dataset.

SUMMARY

Some aspects described herein relate to a method of wireless communication performed by a device. The method may include receiving a plurality of temperature measurements from a plurality of sensors of the device, where the plurality of temperature measurements indicate a temperature of one or more components of the device during a time window. The method may include determining, based at least in part on the plurality of temperature measurements, an acceleration and a rate at which the temperature of the device changes during the time window. The method may include performing one or more actions based at least in part on the acceleration and the rate at which the temperature of the device changes during the time window.

Some aspects described herein relate to a method of wireless communication performed by a device. The method may include receiving a first plurality of temperature measurements from a plurality of sensors of the device, where the first plurality of temperature measurements is associated with a first time window. The method may include generating a first heatmap based at least in part on the first plurality of temperature measurements and respective locations of the plurality of sensors of the device. The method may include receiving a second plurality of temperature measurements from the plurality of sensors of the device, where the second plurality of temperature measurements is associated with a second time window. The method may include generating a second heatmap based at least in part on the second plurality of temperature measurements and the respective locations of the plurality of sensors of the device. The method may include monitoring a temperature of the device based at least in part on the first heatmap and the second heatmap. The method may include performing one or more actions based at least in part on monitoring the temperature of the device.

Some aspects described herein relate to a non-transitory computer-readable medium that stores a set of instructions for wireless communication by a device. The set of instructions, when executed by one or more processors of the device, may cause the device to receive a plurality of temperature measurements from a plurality of sensors of the device, where the plurality of temperature measurements indicate a temperature of one or more components of the device during a time window. The set of instructions, when executed by one or more processors of the device, may cause the device to determine, based at least in part on the plurality of temperature measurements, an acceleration and a rate at which the temperature of the device changes during the time window. The set of instructions, when executed by one or more processors of the device, may cause the device to perform one or more actions based at least in part on the acceleration and the rate at which the temperature of the device changes during the time window.

Some aspects described herein relate to a non-transitory computer-readable medium that stores a set of instructions for wireless communication by a device. The set of instructions, when executed by one or more processors of the device, may cause the device to receive a first plurality of temperature measurements from a plurality of sensors of the device, where the first plurality of temperature measurements is associated with a first time window. The set of instructions, when executed by one or more processors of the device, may cause the device to generate a first heatmap based at least in part on the first plurality of temperature measurements and respective locations of the plurality of sensors of the device. The set of instructions, when executed by one or more processors of the device, may cause the device to receive a second plurality of temperature measurements from the plurality of sensors of the device, where the second plurality of temperature measurements is associated with a second time window. The set of instructions, when executed by one or more processors of the device, may cause the device to generate a second heatmap based at least in part on the second plurality of temperature measurements and the respective locations of the plurality of sensors of the device. The set of instructions, when executed by one or more processors of the device, may cause the device to monitor a temperature of the device based at least in part on the first heatmap and the second heatmap. The set of instructions, when executed by one or more processors of the device, may cause the device to perform one or more actions based at least in part on monitoring the temperature of the device.

Some aspects described herein relate to a device for wireless communication. The device may include one or more memories and one or more processors coupled to the one or more memories. The one or more processors may be configured to receive a plurality of temperature measurements from a plurality of sensors of the device, where the plurality of temperature measurements indicate a temperature of one or more components of the device during a time window. The one or more processors may be configured to determine, based at least in part on the plurality of temperature measurements, an acceleration and a rate at which the temperature of the device changes during the time window. The one or more processors may be configured to perform one or more actions based at least in part on the acceleration and the rate at which the temperature of the device changes during the time window.

Some aspects described herein relate to a device for wireless communication. The device may include one or more memories and one or more processors coupled to the one or more memories. The one or more processors may be configured to receive a first plurality of temperature measurements from a plurality of sensors of the device, where the first plurality of temperature measurements is associated with a first time window. The one or more processors may be configured to generate a first heatmap based at least in part on the first plurality of temperature measurements and respective locations of the plurality of sensors of the device. The one or more processors may be configured to receive a second plurality of temperature measurements from the plurality of sensors of the device, where the second plurality of temperature measurements is associated with a second time window. The one or more processors may be configured to generate a second heatmap based at least in part on the second plurality of temperature measurements and the respective locations of the plurality of sensors of the device. The one or more processors may be configured to monitor a temperature of the device based at least in part on the first heatmap and the second heatmap. The one or more processors may be configured to perform one or more actions based at least in part on monitoring the temperature of the device.

Some aspects described herein relate to an apparatus for wireless communication. The apparatus may include means for receiving a plurality of temperature measurements from a plurality of sensors of the apparatus, where the plurality of temperature measurements indicate a temperature of one or more components of the apparatus during a time window. The apparatus may include means for determining, based at least in part on the plurality of temperature measurements, an acceleration and a rate at which the temperature of the apparatus changes during the time window. The apparatus may include means for performing one or more actions based at least in part on the acceleration and the rate at which the temperature of the apparatus changes during the time window.

Some aspects described herein relate to an apparatus for wireless communication. The apparatus may include means for receiving a first plurality of temperature measurements from a plurality of sensors of the apparatus, where the first plurality of temperature measurements is associated with a first time window. The apparatus may include means for generating a first heatmap based at least in part on the first plurality of temperature measurements and respective locations of the plurality of sensors of the apparatus. The apparatus may include means for receiving a second plurality of temperature measurements from the plurality of sensors of the apparatus, where the second plurality of temperature measurements is associated with a second time window. The apparatus may include means for generating a second heatmap based at least in part on the second plurality of temperature measurements and the respective locations of the plurality of sensors of the apparatus. The apparatus may include means for monitoring a temperature of the apparatus based at least in part on the first heatmap and the second heatmap. The apparatus may include means for performing one or more actions based at least in part on monitoring the temperature of the apparatus.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a flowchart of an example process associated with time-windowed heatmaps in mobile applications, in accordance with the present disclosure.

DETAILED DESCRIPTION

Figure 1:
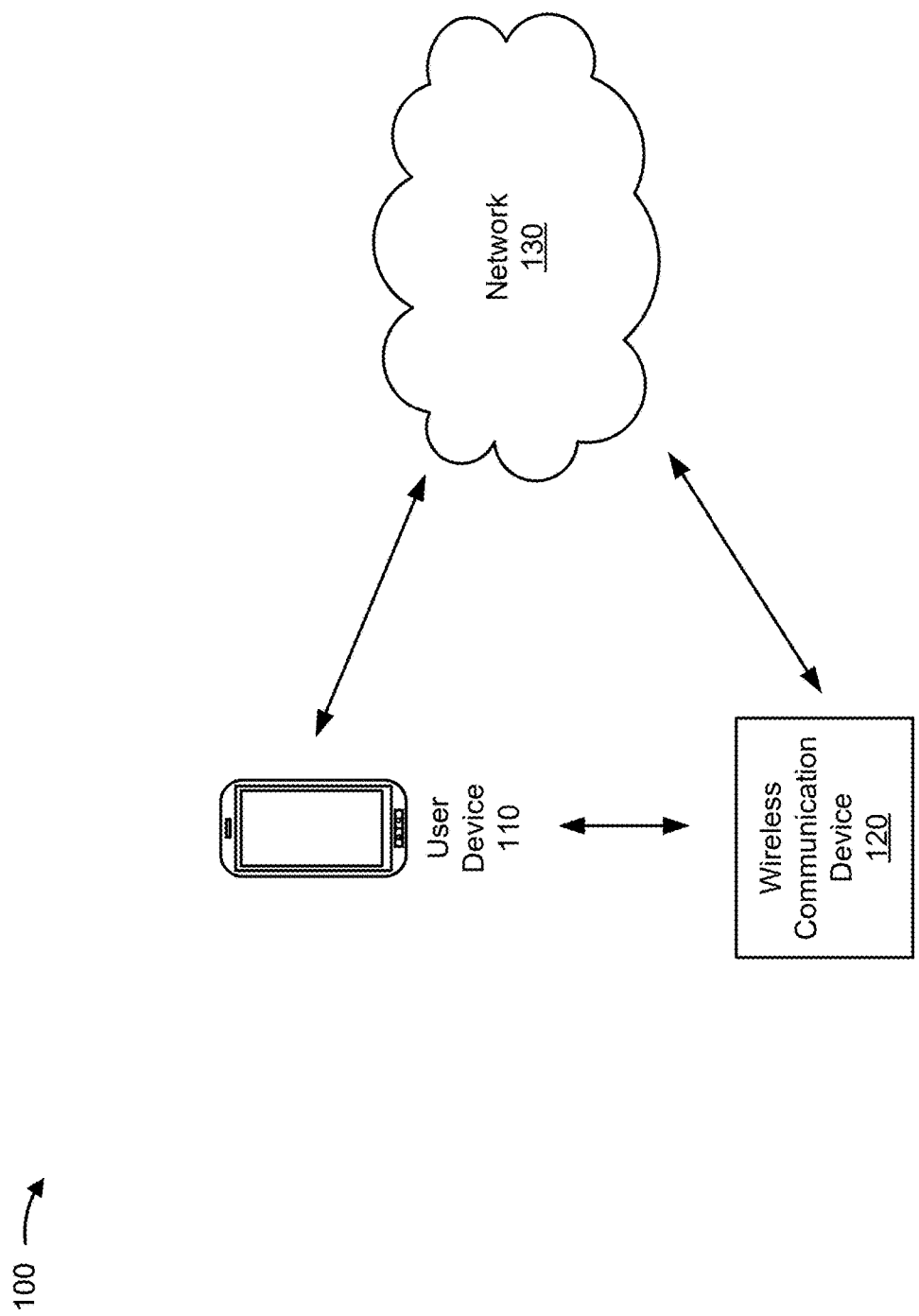
FIG. 1 is a diagram illustrating an example environment in which a device described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

During operation, various components of a wireless communication device (e.g., a user equipment (UE)) may generate heat. In some cases, the amount of heat generated may cause the wireless communication device to experience overheating. For example, a UE may experience overheating due to high rates of data transfer, due to the bandwidth frequency spectrum used by the UE, due to the quantity of layers activated for the UE, due to a type of application currently running on the UE (e.g., gaming, virtual reality (VR), and/or extended reality (XR) applications), due to a quantity of applications currently running on the UE, due to the battery of the UE currently charging (e.g., fast charging and/or charging the battery concurrently with running one or more applications), the UE being placed in a hot environment, the UE being placed in direct sunlight, other factors that may cause a temperature of the UE to increase, or a combination of more than one of the foregoing. In some cases, the UE may include a component and/or execute an application that monitors the operating temperature of one or more components of the UE. The component and/or application may detect overheating when the operating temperature of the one or more components satisfies (e.g., exceeds) a temperature threshold. In some cases, overheating may result in a degraded user experience, high device skin temperatures, and/or physical damage to one or more components of the UE.

In some cases, upon detecting overheating, the UE may cause one or more actions or preventative measures to be performed to reduce the operating temperature of the one or more components. For example, the UE may perform thermal throttling, reduce one or more communication parameters of the UE (e.g., reduce a peak and/or maximum data throughput), reduce a quantity of applications executing on the UE, reduce a rate at which a battery of the UE is being recharged, alter a display of content, alter a refresh rate associated with displaying the content, shut down the device or one or more components of the device, and/or the like.

Some implementations described herein enable a wireless communication device to generate time-windowed heatmaps and to utilize the time-windowed heatmaps to perform one or more actions to prevent overheating from occurring. As a result, the wireless communication device may perform proactive measures to prevent overheating (rather that reactive measures performed after overheating has occurred). By preventing overheating, the wireless communication device may prevent a degraded user experience caused by overheating, high device skin temperatures, and/or physical damage to one or more components of the wireless communication device.

FIG. 1 is a diagram illustrating an example environment 100 in which a device described herein may be implemented, in accordance with various aspects of the present disclosure. As shown in FIG. 1, environment 100 may include a user device 110, a wireless communication device 120, and/or a network 130. Devices of environment 100 may interconnect via wired connections, wireless connections, or a combination of wired and wireless connections.

User device 110 includes one or more devices capable of including one or more sensor modules described herein. For example, user device 110 may include one or more devices capable of receiving, generating, storing, processing, and/or providing information associated with one or more sensors described herein. More specifically, user device 110 may include a communication and/or computing device, such as a mobile phone (e.g., a smart phone, a radiotelephone, etc.), a laptop computer, a tablet computer, a handheld computer, a desktop computer, a gaming device (e.g., a VR gaming device, an XR gaming device, etc.), a wearable communication device (e.g., a smart wristwatch, a pair of smart eyeglasses, etc.), or a similar type of device.

Similar to user device 110, wireless communication device 120 includes one or more devices capable of receiving, generating, storing, processing, and/or providing information associated with one or more sensors described herein. For example, wireless communication device 120 may include a base station, an access point, and/or the like. Additionally, or alternatively, similar to user device 110, wireless communication device 120 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
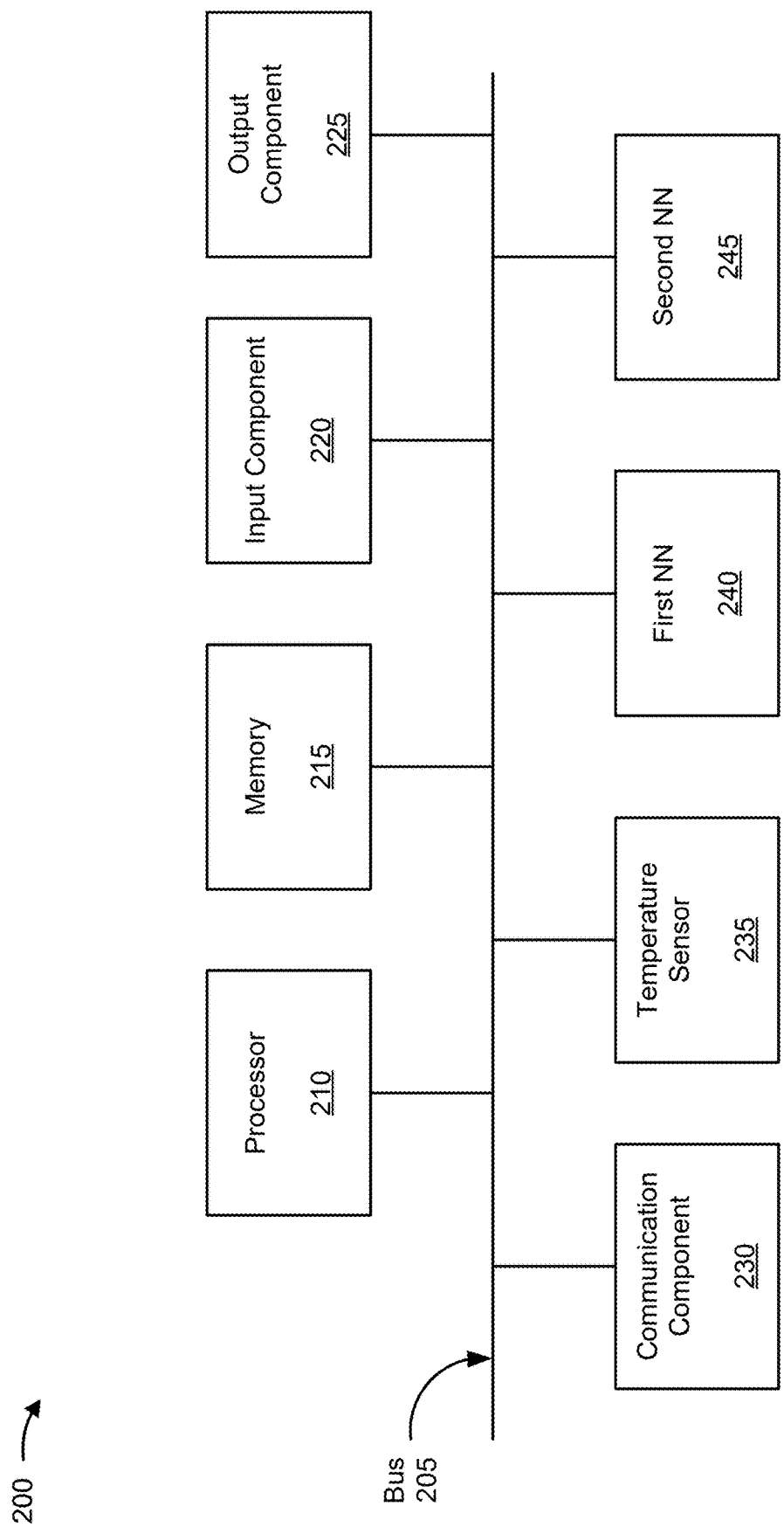
FIG. 2 is a diagram illustrating example components of a device, in accordance with the present disclosure.

FIG. 2 is a diagram illustrating example components of a device 200, in accordance with the present disclosure. The device 200 may correspond to UE 110 and/or wireless communication device 120. In some aspects, UE 110 and/or wireless communication device 120 may include one or more devices 200 and/or one or more components of the device 200. As shown in FIG. 2, the device 200 may include a bus 205, a processor 210, a memory 215, an input component 220, an output component 225, a communication component 230, a temperature sensor 235, a first neural network (NN) 240, and a second NN 245.

The bus 205 may include one or more components that enable wired and/or wireless communication among the components of the device 200. The bus 205 may couple together two or more components of FIG. 2, such as via operative coupling, communicative coupling, electronic coupling, and/or electric coupling. For example, the bus 205 may include an electrical connection (e.g., a wire, a trace, and/or a lead) and/or a wireless bus. The processor 210 may include a central processing unit, a graphics processing unit, a microprocessor, a controller, a microcontroller, a digital signal processor, a field-programmable gate array, an application-specific integrated circuit, and/or another type of processing component. The processor 210 may be implemented in hardware, firmware, or a combination of hardware and software. In some aspects, the processor 210 may include one or more processors capable of being programmed to perform one or more operations or processes described elsewhere herein.

The memory 215 may include volatile and/or nonvolatile memory. For example, the memory 215 may include random access memory (RAM), read only memory (ROM), a hard disk drive, and/or another type of memory (e.g., a flash memory, a magnetic memory, and/or an optical memory). The memory 215 may include internal memory (e.g., RAM, ROM, or a hard disk drive) and/or removable memory (e.g., removable via a universal serial bus connection). The memory 215 may be a non-transitory computer-readable medium. The memory 215 may store information, one or more instructions, and/or software (e.g., one or more software applications) related to the operation of the device 200. In some aspects, the memory 215 may include one or more memories that are coupled (e.g., communicatively coupled) to one or more processors (e.g., processor 210), such as via the bus 205. Communicative coupling between a processor 210 and a memory 215 may enable the processor 210 to read and/or process information stored in the memory 215 and/or to store information in the memory 215.

The input component 220 may enable the device 200 to receive input, such as user input and/or sensed input. For example, the input component 220 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 225 may enable the device 200 to provide output, such as via a display, a speaker, and/or a light-emitting diode. The communication component 230 may enable the device 200 to communicate with other devices via a wired connection and/or a wireless connection. For example, the communication component 230 may include a receiver, a transmitter, a transceiver, a modem, a network interface card, and/or an antenna.

The temperature sensor 235 may include one or more temperature sensor components configured to sense a temperature of a component of the device 200 and/or an internal temperature within a casing or housing enclosing one or more components of the device 200. In some aspects, temperature sensor 235 may include a thermistor, such as a positive temperature coefficient (PTC)-type thermistor or a negative temperature coefficient (NTC)-type thermistor. In some aspects, temperature sensor 235 may include another type of temperature sensor component, such as a thermocouple, a semiconductor-based thermometer, one or more temperature sensors and/or circuits integrated inside different Integrated Circuits (ICs) of the device 200 (e.g., a user device 110), an infrared-based thermometer, and/or the like. In some aspects, temperature sensor 235 may provide temperature measurement data to processor 210. For example, the temperature sensor 235 may be configured to sense a temperature of a component of the device 200, generate a signal corresponding to the sensed temperature, and provide the generated signal to the processor 210.

The first NN 240 may perform one or more operations or processes related to generating a board level and/or an IC level heatmap described herein. In some aspects, the first NN 240 may include a generative artificial NN (GAN) and/or a NN. In some aspects, the GAN may comprise two multi-layer NNs (e.g., a generator and a discriminator).

In some aspects, the GAN and/or the NN may be a trained GAN and/or a trained NN. For example, the GAN and/or the NN may be trained on historical sensor data and/or historical device information to generate an output corresponding to a board level heatmap and/or an IC level heatmap. In some aspects, the generator and the discriminator of the GAN may be trained together. In some aspects, the generator may generate new images or thermal heatmaps using random numbers. The discriminator may be trained to distinguish between real images and fake images (e.g., images generated by the generator). In some aspects, the generator and the discriminator may be trained in a closed-loop to enable the images generated by the generator to closely resemble real images.

The second NN 245 may perform one or more operations or processes related to generating a time-based heatmap and/or determining an acceleration and a rate of temperature at which a temperature of a component changes during a time window described herein. In some aspects, the second NN 245 may include a recursive NN (RNN), a Hidden Markov Model (HMM), Shallow NN, a Deep NN, and/or a Convolutional NN. In some aspects, second NN 245 may include the RNN and/or the HMM and may provide improved latency and/or less complexity relative to a Deep NN. In some aspects, the RNN may comprise structural NNs that work in a sequential or cascaded manner to predict signals in time series.

In some aspects, the RNN and/or the HMM may be a trained RNN and/or a trained HMM. For example, the RNN and/or the HMM may be trained on historical sensor data, historical device information, and/or historical board-level heatmaps to generate an output corresponding to a time-based heatmap and/or an output indicating an acceleration and a rate of temperature at which a temperature of a component changes during a time window.

The device 200 may perform one or more operations or processes described herein. For example, a non-transitory computer-readable medium (e.g., memory 215) may store a set of instructions (e.g., one or more instructions or code) for execution by the processor 210. The processor 210 may execute the set of instructions to perform one or more operations or processes described herein. In some aspects, execution of the set of instructions, by one or more processors 210, causes the one or more processors 210 and/or the device 200 to perform one or more operations or processes described herein. In some aspects, hardwired circuitry may be used instead of or in combination with the instructions to perform one or more operations or processes described herein. Additionally, or alternatively, the processor 210 may be configured to perform one or more operations or processes described herein. Thus, aspects described herein are not limited to any specific combination of hardware circuitry and software.

In some aspects, device 200 may include means for receiving a plurality of temperature measurements from a plurality of sensors of the device, wherein the plurality of temperature measurements indicate a temperature of one or more components of the device during a time window; means for determining, based at least in part on the plurality of temperature measurements, an acceleration and a rate at which the temperature of the device changes during the time window; and/or means for performing one or more actions based at least in part on the acceleration and the rate at which the temperature of the device changes during the time window. In some aspects, device 200 may include means for receiving a first plurality of temperature measurements from a plurality of sensors of the device, wherein the first plurality of temperature measurements is associated with a first time window; means for generating a first heatmap based at least in part on the first plurality of temperature measurements and respective locations of the plurality of sensors of the device; means for receiving a second plurality of temperature measurements from the plurality of sensors of the device, wherein the second plurality of temperature measurements is associated with a second time window; means for generating a second heatmap based at least in part on the second plurality of temperature measurements and the respective locations of the plurality of sensors of the device; means for monitoring a temperature of the device based at least in part on the first heatmap and the second heatmap; and/or means for performing one or more actions based at least in part on monitoring the temperature of the device. In some aspects, the means for device 200 to perform processes and/or operations described herein may include one or more components of device 200 described in connection with FIG. 2, such as bus 205, processor 210, memory 215, input component 220, output component 225, communication component 230, temperature sensor 235, the first NN 240, and/or the second NN 245.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

FIGS. 3A-3E are diagrams illustrating an example associated with time-windowed heatmaps in mobile applications, in accordance with the present disclosure. As shown in FIGS. 3A-3E, a device 300 (e.g., the UE 110, the wireless communication device 120, and/or the device 200) may include a plurality of temperature sensors 235-1 through 235-N (hereinafter referred to individually as "temperature sensor 235" and collectively as "temperature sensors 235"), a plurality of components 305-1 through 305-N (hereinafter referred to individually as "component 305" and collectively as "components 305"), a processor 210, a first NN 240, and a second NN 245.

In some aspects, the first NN 240 and/or the second NN 245 may be implemented by the processor 210. Additionally, or alternatively, the first NN 240 and/or the second NN 245 may be implemented by one or more other processors 210.

In some aspects, the components 305 may include the bus 205, the processor 210, the memory 215, the input component 220, the output component 225, the communication component 230, an interior space defined by a casing of the device 300, one or more applications or processes running on the device 300 (e.g., an image compression process, a navigation application, a VR gaming application, a document rendering application, a Gaussian blur process, a facial recognition process, a speech recognition process, etc.), and/or the like. In some aspects, one or more of the temperature sensors 235 may be associated with each of the components 305. For example, one or more of the temperature sensors 235 may be associated with the bus 205, the processor 210, the memory 215, the input component 220, the output component 225, the communication component 230, the interior space defined by the casing of the device 300, the one or more applications or processes running on the device 300, and/or the like.

In some aspects, the temperature sensors 235 may monitor the components 305 to sense a respective temperature associated with each of the components 305. As shown by reference number 310, the temperature sensors may obtain data corresponding to the sensed temperature of the components.

In some aspects, the temperature sensors 235 may periodically sense the respective temperatures of the components 305, may sense the respective temperatures of the components 305 based at least in part on an occurrence of an event (e.g., an application or process begins running on the device 300, a quantity of applications or processes running on the device 300, a type of application or process running on the device 300, receiving an indication from the processor 210, and/or the like), a schedule (e.g., at particular times determined based at least in part on historical temperature measurements, during time periods associated with heavy usage and/or high data throughput, and/or the like), a quantity of available computing resources (e.g., a quantity of available computing resources satisfying (e.g., being less than or equal to) an available computing resources threshold), and/or the like.

As shown by reference number 315, the temperature sensors 235 may provide sensor data to the processor 210. In some aspects, the sensor data may include data indicating a plurality of temperatures of one or more components of the device 300 sensed by the temperature sensors 235. In some aspects, the sensor data may also include an indication of one or more characteristics associated with the plurality of temperatures. For example, the sensor data may indicate a time window during which the temperatures were sensed by the temperature sensors 235, a time at which each temperature of the plurality of temperatures were sensed by the temperature sensors 235, a component 305 associated with each temperature of the plurality of temperatures, a location within the interior portion of the device 300 at which a component 305 associated with each temperature of the plurality of temperatures is located, a temperature sensor that sensed each temperature of the plurality of temperatures, a location within the interior portion of the device 300 at which each temperature sensor 235 is located, and/or the like.

Figure 3A:
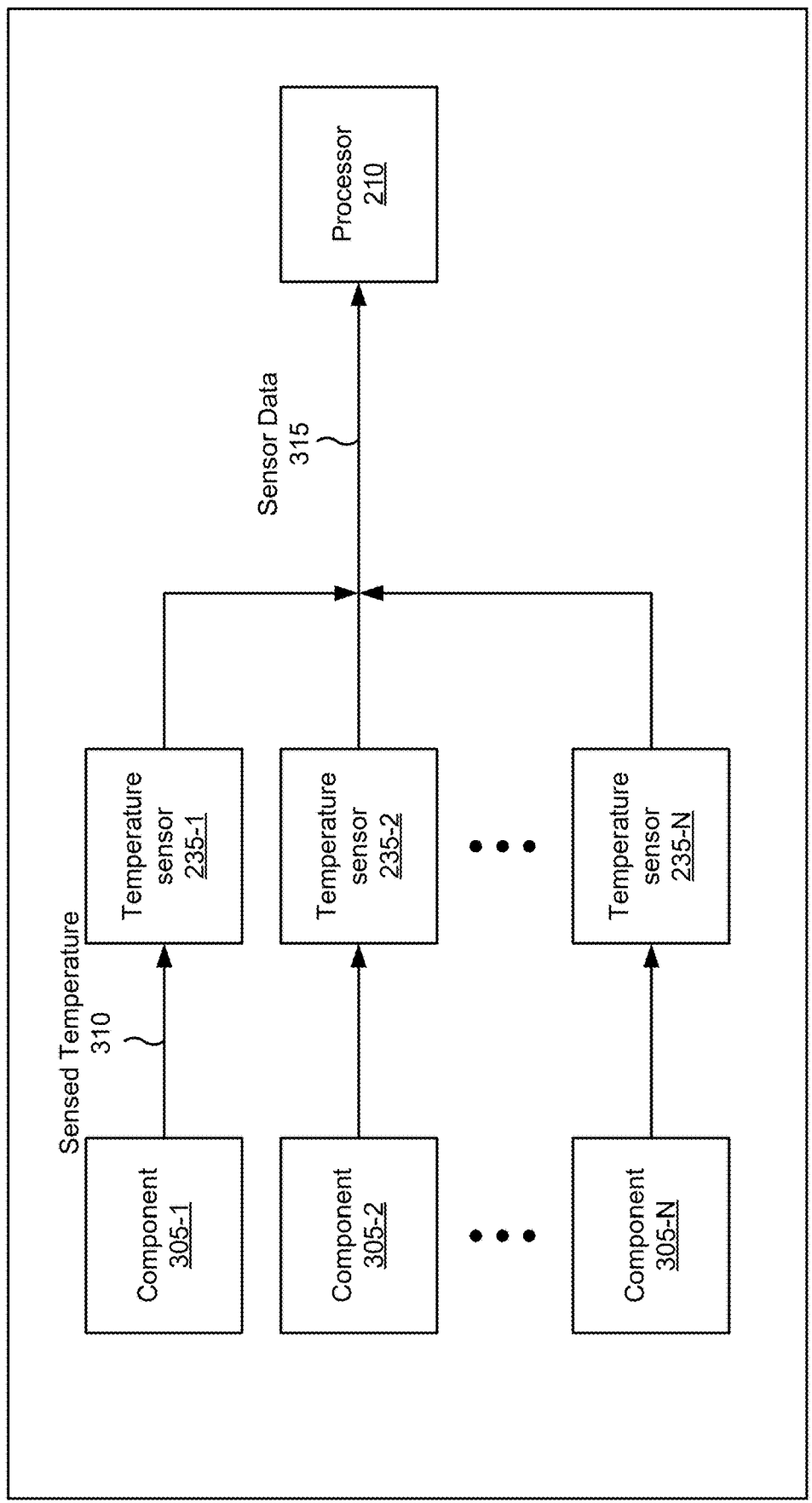
FIGS. 3A-3E are diagrams illustrating an example associated with time-windowed heatmaps in mobile applications, in accordance with the present disclosure.
Figure 3B:
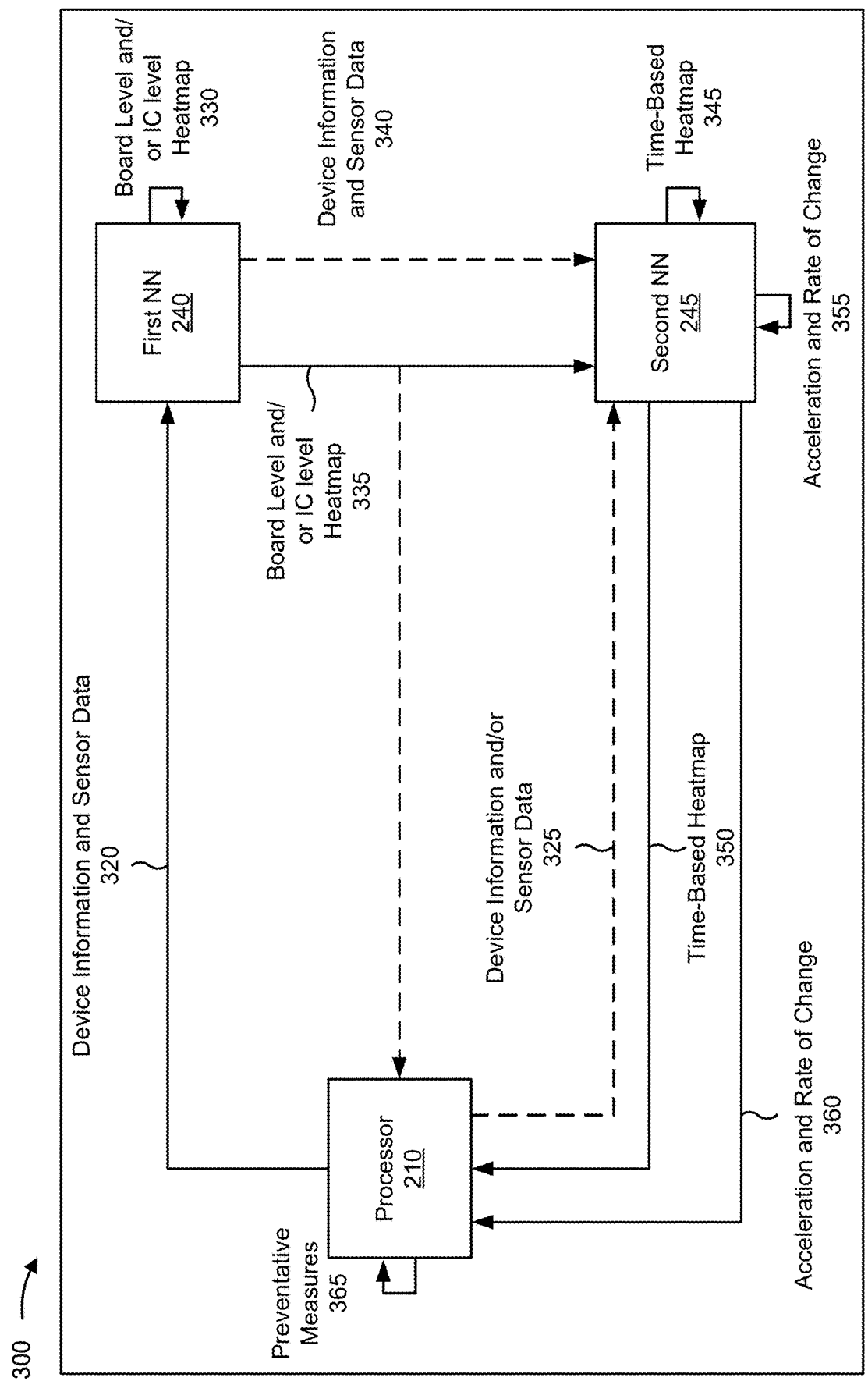

As shown in FIG. 3B, and by reference number 320, the processor 210 may provide device information and the sensor data to the first NN 240. Additionally, or alternatively, as shown by reference number 325, the processor 210 may provide the device information and/or the sensor data to the second NN 245. In some aspects, the device information may include one or more of the characteristics of the temperature measurements. For example, the sensor data may include an indication of the temperature sensor 235 and/or component 305 associated with each of the temperature measurements, and the device information may include information indicating a location of the temperature sensors 235 and/or the components 305 within the interior portion of the device 300.

Additionally, or alternatively, the device information may include information indicating a location of a processing core on an integrated circuit and/or a location of a processing core within the interior portion of the device 300. For example, the device information may include a set of coordinates (or a similar type of information) indicating a location of a processing core on an integrated circuit and/or a set of coordinates (or a similar type of information) indicating a location of a processing core within the interior portion of the device 300.

Additionally, or alternatively, the device information may include usage information. In some aspects, the usage information may include an indication of an application or process currently running on the device 300, information associated with content being displayed to, processed, and/or generated for a user of the device 300. For example, the usage information may include information indicating an identifier associated with an application or process currently running on the device 300, a type of content being displayed, a rate at which data is being communicated to and/or processed by the device 300 (e.g., the processor 210), predicted content (e.g., content that the device 300 expects (predicted based at least in part on historical information, a type of content currently being displayed to, processed, and/or generated for the user, etc.)), and/or the like.

Figure 3C:
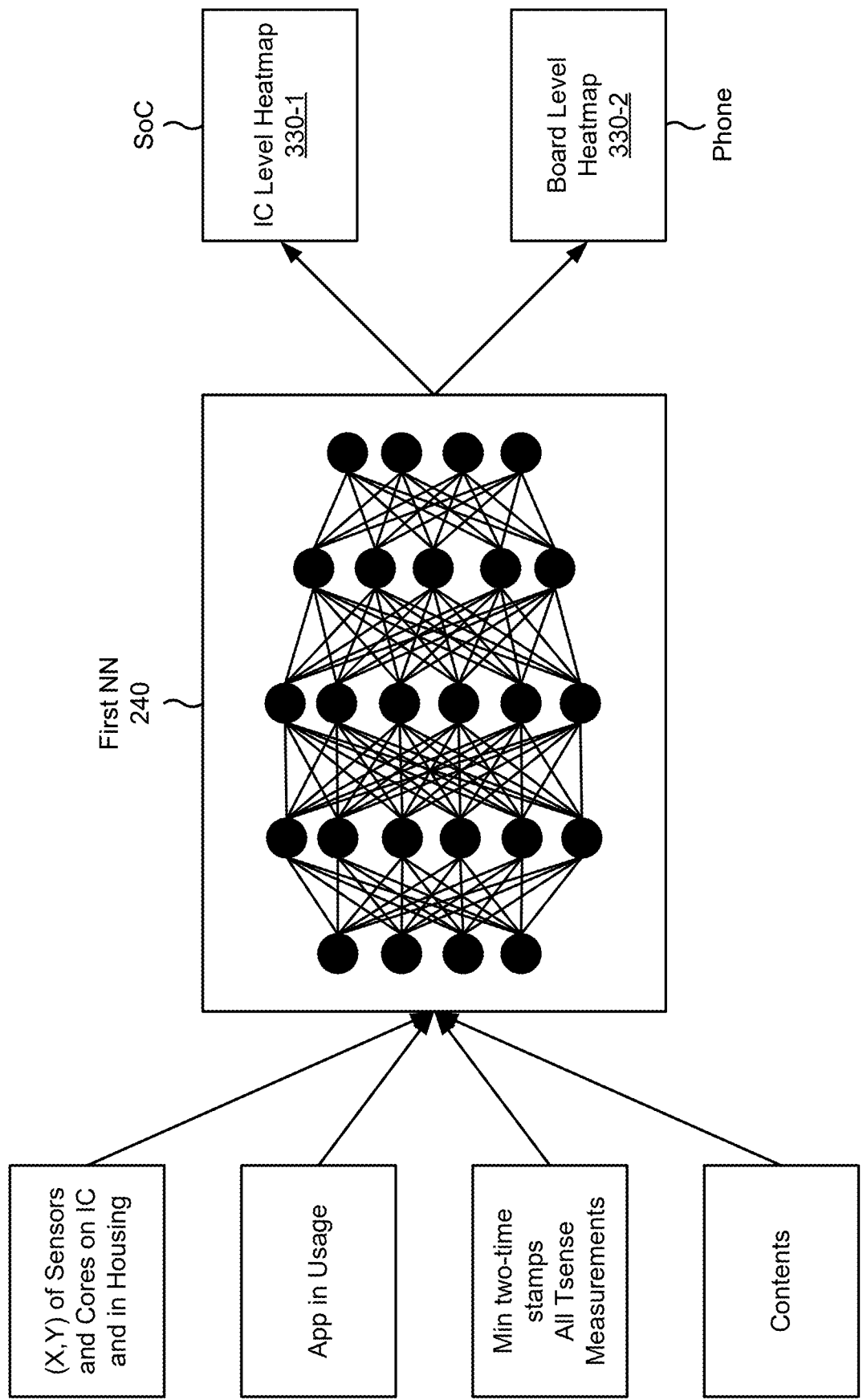

As shown by reference number 330, the first NN 240 may generate a board level heatmap based at least in part on the device information and the sensor data. For example, as shown in FIG. 3C, the first NN 240 receives device information and sensor data indicating coordinates of the temperatures sensors 235 and a set of one or more processing cores on an integrated circuit and within the interior portion of the device 300, an application currently running on the device 300, temperature measurements obtained by the temperature sensors 235, at least two time stamps indicating a time period during which the temperature measurements were obtained by the temperature sensors 235, and contents being displayed to, processed by, and/or generated for a user of the device 300.

In some aspects, the first NN 240 processes the device information and sensor data and generates one or more board and/or IC level heatmaps. For example, as shown in FIG. 3C, the first NN 240 processes the device information and sensor data and generates IC level heatmap 330-1 associated with a software on chip (SoC) integrated circuit and a board level heatmap 330-2 associated with the interior portion of the device 300.

In some aspects, the board level heatmap may comprise a localized heatmap. The localized heatmap may be centered around a particular component (e.g., a particular IC that is currently being utilized by the device 300) or area. In some aspects, because a localized heatmap is centered around a particular component or area, the first NN 240 may be able to quickly generate an accurate thermal heatmap for a particular component or area of the device 300.

In some aspects, the first NN 240 may generate the board and/or IC level heatmap based at least in part on merging sets of temperature measurements. For example, the first NN 240 may identify a set of temperature measurements associated with a location and/or a component 305. The first NN 240 may merge the set of temperature measurements in two-dimensional contours. For example, the first NN 240 may utilize average-pooling or smooth-windowing to merge the set of temperature measurements in two-dimensional contours.

In some aspects, the first NN 240 may periodically receive device information and/or sensor data from the processor 210. In some aspects, the first NN 240 may periodically generate one or more board and/or IC level heatmaps based at least in part on periodically receiving the device information and/or the sensor data.

In some aspects, the first NN 240 may generate one or more board and/or IC level heatmaps each time the first NN 240 receives the device information and/or the sensor data from the processor 210. In some aspects, the first NN 240 may generate one or more board and/or IC level heatmaps after receiving a particular quantity of device information and/or sensor data. For example, the first NN 240 may generate one or more board and/or IC level heatmaps after receiving two sets of device information and/or sensor data from the processor 210, after receiving three sets of device information and/or sensor data from the processor 210, after receiving four sets of device information and/or sensor data from the processor 210, and/or the like.

In some aspects, the first NN 240 may provide the one or more board and/or IC level heatmaps to the processor 210. In some aspects, the processor 210 may monitor a temperature of the device 300 (e.g., a temperature of one or more components 305) based at least in part on the one or more board and/or IC level heatmaps. For example, the processor 210 (and/or the first NN 240 and/or the second NN 245) may predict an occurrence of an event affecting an acceleration or a rate at which the temperature of the device 300 changes during a future time window based at least in part on the one or more board and/or IC level heatmaps.

In some aspects, the processor 210 may perform one or more actions based at least in part on monitoring the temperature of the device 300 and/or predicting the occurrence of the event affecting the acceleration or the rate at which the temperature of the device 300 changes during the future time window. For example, the processor 210 may perform and/or cause to be performed one or more preventive measures for preventing and/or reducing a likelihood of the device 300 overheating.

In some aspects, the one or more preventive measures may include controlling a voltage, a power, and/or a frequency associated with the device 300. For example, the processor 210 and/or one or more components 305 may control a voltage, a power, and/or a frequency associated with one or more other components 305.

In some aspects, the processor 210 and/or the one or more components 305 may control the voltage, the power, and/or the frequency associated with the one or more other components 305 by powering down and/or changing a power mode of the one or more other components 305. For example, the processor 210 may prevent power from being supplied to the one or more other components 305, may reduce an amount of power that is being supplied to the one or more other components 305, may cause the one or more components 305 to transition from a full power mode to a reduced power mode, a low power mode, or a sleep state, cause a battery to slow or stop charging, and/or the like.

In some aspects, the one or more components 305 may comprise one or more hardware components of the device 300. In some aspects, the one or more hardware components may be associated with an application and/or a subsystem running on the device 300. For example, the sensor data and/or the one or more board level heatmaps may be associated with an application, a process, and/or a subsystem running on the device 300, and the one or more hardware components may be associated with the application, the process, and/or the subsystem.

In some aspects, the first NN 240 may provide one or more board and/or IC level heatmaps to the processor 210, and the processor 210 may provide the one or more board and/or IC level heatmaps, the device information, and/or the sensor data to the second NN 245.

Additionally, or alternatively, as shown in FIG. 3B, and by reference number 335, the first NN 240 may provide the one or more board and/or IC level heatmaps to the second NN 245. In some aspects, as shown by reference number 340, the first NN 240 may provide the provide device information and the sensor data to the second NN 245 (e.g., additionally, or alternatively, to the processor 210 providing the device information and/or the sensor data to the second NN 245).

In some aspects, the first NN 240 may provide the device information and the sensor data to the second NN 245 as part of, or in conjunction with, the one or more board and/or IC level heatmaps. In some aspects, first NN 240 may provide the device information and the sensor data to the second NN 245 separately from the one or more board and/or IC level heatmaps. For example, the first NN 240 may receive the device information and the sensor data from the processor 210 and may forward a copy of the device information and the sensor data to the second NN 245.

Figure 3D:
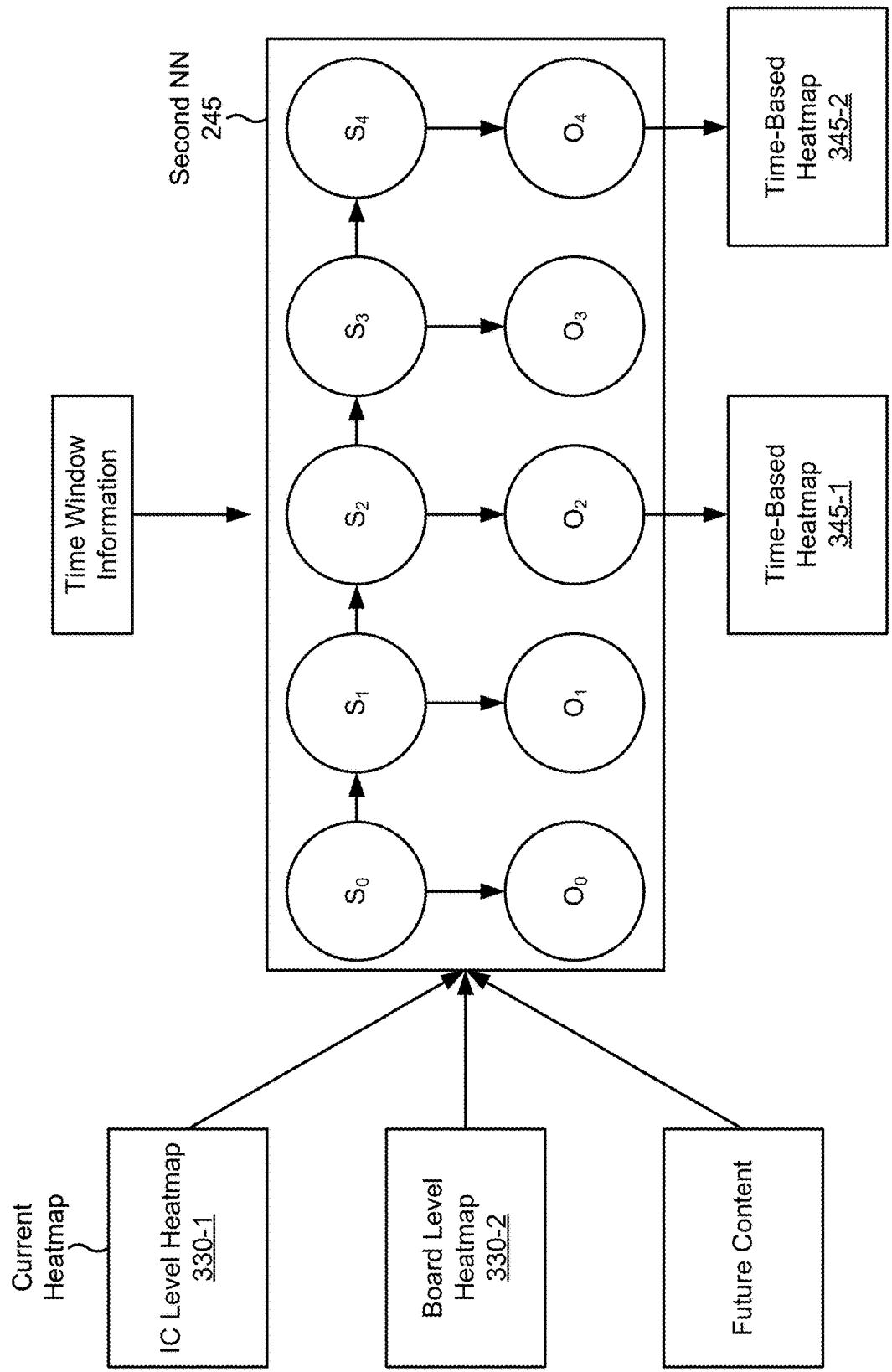

As shown by reference number 345, the second NN 245 may generate a time-based heatmap based at least in part on the one or more board and/or IC level heatmaps, the device information, and/or the sensor data. For example, as shown in FIG. 3D, the IC level heatmap 330-1, the board level heatmap 330-2, device information indicating predicted/future content to be displayed to, processed by, and/or generated for a user of the device 300, and sensor data indicating a time window may be provided, as inputs, to the second NN 245.

The second NN 245 may process the IC level heatmap 330-1, the board level heatmap 330-2, the device information indicating predicted/future content to be displayed to, processed by, and/or generated for a user of the device 300, and the sensor data indicating the time window. The second NN 245 may generate one or more time-based heatmaps (e.g., time-based heatmaps 345-1, 345-2, as shown in FIG. 3D) based at least in part on processing the IC level heatmap 330-1, the board level heatmap 330-2, the device information indicating predicted/future content to be displayed to, processed by, and/or generated for a user of the device 300, and the sensor data indicating the time window.

In some aspects, the second NN 245 may generate the time-based heatmap based at least in part on an ambient thermal map. For example, the second NN 245 generate and/or obtain an ambient thermal map indicating temperatures of various components and/or areas of the device 300. In some aspects, the second NN 245 may utilize the ambient thermal map as a starting point for generating a time-based heatmap. For example, the second NN 245 may obtain additional information associated with the device 300 (e.g., content to be provided to a user, sensor data measured and/or generated by one or more sensors of the device 300, a device identifier associated with the device 300, and/or a location of one or more components of the device 300). The second NN 245 may generate a time-based heatmap based at least in part on the ambient thermal map and the additional information associated with the device 300.

In some aspects, the second NN 245 may generate the time-based heatmap based at least in part on historical data (e.g., historical IC level heatmaps, historical board level heatmaps, historical sensor data, historical ambient thermal maps, and/or the like. In some aspects, the second NN 245 may utilize the historical as a starting point for generating a time-based heatmap. For example, the second NN 245 may obtain additional information associated with the device 300 (e.g., content to be provided to a user, sensor data measured and/or generated by one or more sensors of the device 300, a device identifier associated with the device 300, and/or a location of one or more components of the device 300). The second NN 245 may generate a time-based heatmap based at least in part on the historical data and the additional information associated with the device 300.

In some aspects, the device 300 may include a multiplexer (MUX) switch connected between the second NN 245 and the first NN 240. In some aspects, the device 300 (e.g., processor 210) may control the MUX switch to cause the second NN 245 to the ambient thermal map, the historical data, or the one or more board and/or IC level heatmaps to generate the time-based heatmap.

For example, the device 300 may cause the MUX switch to be set to a first setting to cause the second NN 245 to utilize the ambient thermal to generate the time-based heatmap. The device 300 may cause the MUX switch to be set to a second setting to cause the second NN 245 to utilize historical data to generate the time-based heatmap. The device 300 may cause the MUX switch to be set to a third setting to cause the second NN 245 to utilize the one or more board and/or IC level heatmaps to generate the time-based heatmap.

In some aspects, the second NN 245 may generate a plurality of time-based heatmaps corresponding to a plurality of time windows. In some aspects, the second NN 245 and/or the processor 210 may determine a plurality of time windows based at least in part on the sensor information.

For example, the sensor data may include information indicating a respective time at which each temperature measurement was obtained by the temperature sensors 235 and/or time periods (e.g., a start time and an end time defining each time window) during which groups of temperature measurements were obtained by the temperature sensors 235. The second NN 245 and/or the processor 210 may determine the plurality of time windows based at least in part on the respective times at which each temperature measurement was obtained and/or the time periods.

In some aspects, the second NN 245 may identify temperature measurements and/or device information associated with each time window of the plurality of time windows. The second NN 245 may process the temperature measurements and/or device information and may generate a time-based heatmap associated with each time window of the plurality of time windows.

As shown in FIG. 3B, and by reference number 350, the second NN 245 may provide the time-based heatmap (or the plurality of time-based heatmaps) to the processor 210. In some aspects, the processor 210 may monitor the temperatures of device 300 (e.g., the temperature of one or more components 305) based at least in part on one or more time-based heatmaps generated by the second NN 245.

For example, the processor 210 may receive a time-based heatmap from the second NN 245. The processor 210 may analyze the time-based heatmap and may determine that a temperature of the device 300 (e.g., a temperature of one or more components 305) is expected to satisfy a temperature threshold. For example, based at least in part on analyzing the time-based heatmap, the processor 210 may determine that a likelihood that the temperature of the device 300 exceeding the temperature threshold satisfies a threshold (e.g., is greater than or equal to 75%, 85%, 95%, and/or the like).

In some aspects, the processor 210 may determine that the temperature of the device 300 is expected to satisfy the temperature threshold based at least in part on information received from the second NN 245. For example, the second NN 245 may transmit information indicating that the temperature of the device 300 is expected to satisfy the temperature threshold to the processor 210.

In some aspects, as shown by reference number 355, the second NN 245 may determine an acceleration and a rate at which a temperature of the device 300 (e.g., a temperature of one or more components 305) changes during a time window. The second NN 245 may determine that the temperature of the device 300 is expected to satisfy the temperature threshold based at least in part on the acceleration and the rate at which the temperature of the device 300 changes during the time window.

Figure 3E:
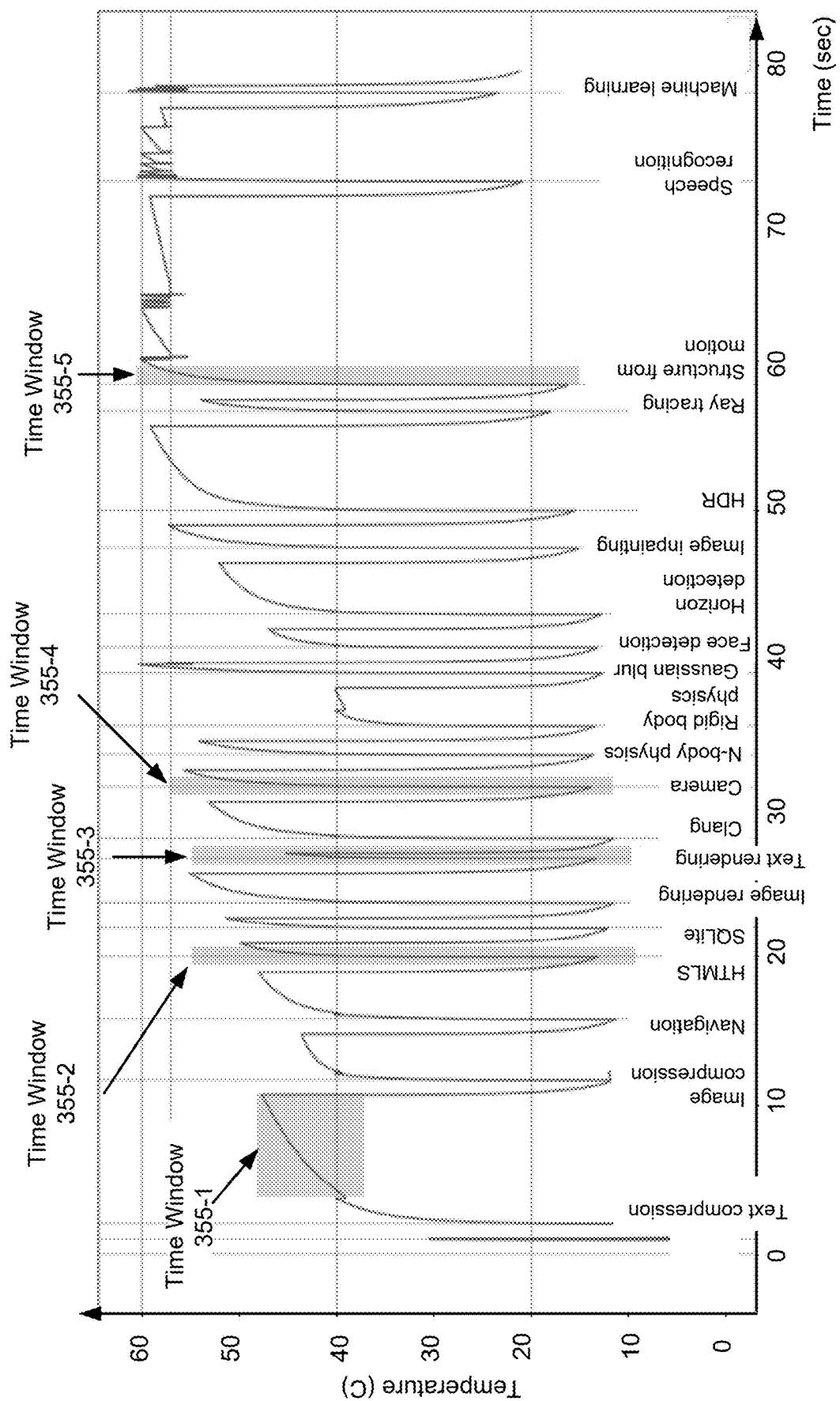

FIG. 3E, depicts a thermal-value graph indicating temperatures of a group of components 305 over a time period. For each component 305 of the group of components 305, the second NN 245 may determine a respective time window (e.g., time windows 355-1 through 355-5, as shown in FIG. 3E). For each time window, the second NN 245 may determine an acceleration and a rate at which the temperature of the associated component 305 changes during the time window. In some aspects, the second NN 245 may determine the acceleration and the rate at which the temperature of the associated component 305 changes during the time window based at least in part on the sensor data. Additionally, or alternatively, the second NN 245 may determine the acceleration and the rate at which the temperature of the associated component 305 changes based at least in part on one or more board level heatmaps generated by the first NN 240.

In some aspects, the second NN 245 may generate the time-based heatmap, a future/predicted time-based heatmap, and/or a future/predicted thermal-value graph based at least in part on a current thermal-value graph. For example, the second NN 245 may generate and/or receive (e.g., from processor 210) a thermal-value graph indicating current temperatures of a group of component 305. The second NN 245 may generate the time-based heatmap, a future/predicted time-based heatmap, and/or a future/predicted thermal-value graph based at least in part on a current thermal-value graph. In some aspects, the second NN 245 may only generate a thermal-value graph (e.g., the second NN 245 may not generate the time-based heatmap).

As shown in FIG. 3B, and by reference number 360, the second NN 245 may provide information indicating the acceleration and the rate at which the temperature of the device 300 (e.g., one or more associated components 305) changes during the time window to the processor 210. In some aspects, the processor 210 may determine the acceleration and the rate at which the temperature of the device 300 (e.g., the temperatures of the one or more associated components 305) changes during one or more time windows. For example, the processor 210 may determine the acceleration and the rate at which the temperatures of the one or more associated components 305 change during one or more time windows based at least in part on the sensor data and/or one or more board level heatmaps generated by the first NN 240 in a manner similar to that described above with respect to the second NN 245.

In some aspects, the second NN 245 may determine that the temperature of the component 305 is expected to satisfy the temperature threshold based at least in part on the acceleration and the rate at which the temperature of the device 300 changes during the time window. The second NN 245 may provide information indicating that the temperature of the device 300 is expected to satisfy the temperature threshold and/or the acceleration and the rate at which the temperature of the device 300 changes during the time window to the processor 210. The processor 210 may determine that the temperature of the device 300 is expected to satisfy the temperature threshold based at least in part on the information received from the second NN 245.

As shown by reference number 365, the processor 210 may determine one or more preventative measures based at least in part on determining that the temperature of the device 300 is expected to satisfy the temperature threshold. Additionally, or alternatively, the second NN 245 may determine the one or more preventative measures and may provide information indicating the one or more preventative measures to the processor 210.

In some aspects, the one or more preventative measures are associated with a voltage, a power, and/or a frequency associated with the device 300. For example, the one or more preventative measures may include controlling a voltage, a power, and/or a frequency associated with one or more components 305. In some aspects, the processor 210 may control the voltage, the power, and/or the frequency of the device 300.

In some aspects, the processor 210 may cause a component 305 to control the voltage, the power, and/or frequency associated with the device 300. For example, the processor 210 may cause a component 305 to control the voltage, the power, and/or frequency associated with one or more other components 305.

In some aspects, the component 305 may comprise a modem of the device 300. For example, the processor 210 may cause the modem to change a power and/or a frequency at which a communication is transmitted.

In some aspects, the one or more preventative measures may be associated with content associated with the temperature measurements (e.g., content being generated, processed, and/or displayed by one or more components 305). In some aspects, the one or more preventative measures may include adjusting one or more parameters associated with the content. For example, the one or more preventative measures may include adjusting a frame rate at which the content is displayed, a brightness of a set of pixels associated with displaying the content, a rate at which the content is processed, a rate at which data corresponding to the content is received, and/or the like.

In some aspects, the one or more preventive measures may include providing an indication of the likelihood that the temperature of the device 300 and/or one or more components 305 is going to satisfy the temperature threshold. For example, the processor 210 may cause the output component 225 to display information indicating the likelihood that the temperature of the device 300 and/or one or more components 305 is going to satisfy the temperature threshold, information indicating the acceleration and the rate at which the temperature of the device 300 and/or one or more components 305 changes during the time window, information indicating the temperatures of the device 300 and/or one or more components 305 during the time window (e.g., a graphical representation of the temperatures with respect to time), information indicating the one or more preventive measures being performed by the device 300, information indicating a result associated with performing the one or more preventive measures (e.g., information indicating that a display rate of the content has been, or is going to be, adjusted, information indicating that the device 300 and/or the one or more components 305 is being powered down, transitioning to a low power mode, or transitioning to a sleep state for a period of time (e.g., until the temperature of the component 305 satisfies (e.g., is less than or equal to) another temperature threshold), etc.) via a display associated with the device 300.

In some aspects, the one or more preventative measures may be associated with charging a battery of the device 300. For example, the processor 210 may cause a rate at which the battery is charging to decrease and/or may cause the battery to stop charging.

In some aspects, the processor 210 and/or the second NN 245 may make one or more additional determinations based at least in part on the board level heatmap, the time-based heatmap, and/or the acceleration and rate at which the temperature of the component changes during the time window. In some aspects, the one or more additional determinations may be associated with a location of a component 305. For example, the processor 210 and/or the second NN 245 may determine a placement of a heat paste, a placement of a heatsink, a placement of an integrated circuit and/or the placement of one or more other components 305 based at least in part on the board level heatmap, the time-based heatmap, and/or the acceleration and rate at which the temperature of the component changes during the time window.

In some aspects, the processor 210 may cause information indicating the determined placement of the heat paste, the heatsink, the integrated circuit, and/or the one or more other components 305 to be output by the output component 225. For example, the processor 210 may provide information indicating the determined placement of the heat paste, the heatsink, the integrated circuit, and/or the one or more other components 305 to the output component 225 and the output component 225 may cause information indicating the determined placement of the heat paste, the heatsink, the integrated circuit, and/or the one or more other components 305 to be displayed via a display of the device 300, to be transmitted to a UE (e.g., UE 110) and/or a wireless communication device (e.g., wireless communication device 120), to be provided audibly to a user via a speaker associated with the device 300, and/or the like. In this way, the information indicating the determined placement of the heat paste, the heatsink, the integrated circuit, and/or the one or more other components 305 may be used to modify a design of the device 300 and/or to design other devices (e.g., other UEs 110 and/or other wireless communication device 120).

In some aspects, the one or more additional determinations may comprise predicting an occurrence of an event that will affect the acceleration and/or the rate at which the temperature of the device 300 and/or a temperature of one or more components 305 changes during a future time window. In some aspects, the one or more additional determinations may include predicting the acceleration and/or the rate at which the temperature of the device 300 and/or the temperature of one or more components 305 will experience during a future time window based at least in part on the occurrence of the predicted event.

As indicated above, in FIGS. 3A-3E are provided as an example. Other examples may differ from what is described with respect to in FIGS. 3A-3E.

FIG. 4 is a flowchart of an example process 400 associated with time-windowed heatmaps in mobile applications, in accordance with the present disclosure. In some aspects, one or more process blocks of FIG. 4 are performed by a device (e.g., device 300). In some aspects, one or more process blocks of FIG. 4 are performed by another device or a group of devices separate from or including the device, such as a UE (e.g., UE 110) and/or a wireless communication device (e.g., wireless communication device 120). Additionally, or alternatively, one or more process blocks of FIG. 4 may be performed by one or more components of device 200, such as processor 210, memory 215, input component 220, output component 225, communication component 230, temperature sensor 235, first NN 240, and/or second NN 245.

As shown in FIG. 4, process 400 may include receiving a plurality of temperature measurements from a plurality of sensors of the device, wherein the plurality of temperature measurements indicate a temperature of one or more components of the device during a time window (block 410). For example, the device may receive a plurality of temperature measurements from a plurality of sensors of the device, wherein the plurality of temperature measurements indicate a temperature of one or more components of the device during a time window, as described above. In some aspects, the plurality of temperature measurements indicate a temperature of one or more components of the device during a time window.

As further shown in FIG. 4, process 400 may include determining, based at least in part on the plurality of temperature measurements, an acceleration and a rate at which the temperature of the device changes during the time window (block 420). For example, the device may determine, based at least in part on the plurality of temperature measurements, an acceleration and a rate at which the temperature of the device changes during the time window, as described above.

As further shown in FIG. 4, process 400 may include performing one or more actions based at least in part on the acceleration and the rate at which the temperature of the device changes during the time window (block 430). For example, the device may perform one or more actions based at least in part on the acceleration and the rate at which the temperature of the device changes during the time window, as described above.

Process 400 may include additional aspects, such as any single aspect or any combination of aspects described below and/or in connection with one or more other processes described elsewhere herein.

In a first aspect, performing the one or more actions comprises controlling one or more of a voltage, a power, or a frequency associated with the device based at least in part on the rate at which the temperature of the device changes during the time window.

In a second aspect, the power and the frequency associated with the device are controlled by one or more of a processor of the device or a modem of the device.

In a third aspect, the device comprises one or more of a virtual reality device or a UE.

In a fourth aspect, process 400 includes receiving information indicating respective locations of the plurality of sensors within a housing of the device, and generating a heatmap based at least in part on the plurality of temperature measurements and the respective locations of the plurality of sensors within the housing of the device.

In a fifth aspect, the heatmap is further generated based at least in part on one or more of information indicating one or more of respective times associated with the plurality of temperature measurements, an application associated with the plurality of temperature measurements, or content associated with the plurality of temperature measurements.

In a sixth aspect, the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements are provided to a GAN, and wherein the GAN generates the heatmap based at least in part on the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements.

In a seventh aspect, the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements are provided to a trained neural network, and wherein the trained neural network generates the heatmap based at least in part on the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements.

In an eighth aspect, generating the heatmap comprises generating a time-based heatmap based at least in part on utilizing an RNN to process the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements.

In a ninth aspect, generating the heatmap comprises generating a board-level heatmap based at least in part on merging measurements, of the plurality of temperature measurements, in two-dimensional contours for the respective locations of the plurality of sensors within the housing of the device.

In a tenth aspect, generating the board-level heatmap comprises utilizing average-pooling or smooth-windowing to merge the measurements in the two-dimensional contours per the respective locations of the plurality of sensors within the housing of the device.

In an eleventh aspect, performing the one or more actions comprises adjusting a content associated with the plurality of temperature measurements based at least in part on the acceleration and the rate at which the temperature of the device changes during the time window.

In a twelfth aspect, performing the one or more actions comprises one or more of powering down one or more hardware components associated with an application or a subsystem running on the device based at least in part on the acceleration and the rate at which the temperature of the device changes during the time window, wherein the application or the subsystem is associated with the plurality of temperature measurements, or changing a power mode of the one or more hardware components based at least in part on the acceleration and the rate at which the temperature of the device changes during the time window.

In a thirteenth aspect, process 400 includes generating a thermal-value graph based at least in part on the plurality of temperature measurements, wherein the acceleration and the rate at which the temperature of the device changes during the time window are determined based at least in part on the thermal-value graph.

Although FIG. 4 shows example blocks of process 400, in some aspects, process 400 includes additional blocks, fewer blocks, different blocks, or differently arranged blocks than those depicted in FIG. 4. Additionally, or alternatively, two or more of the blocks of process 400 may be performed in parallel.

Figure 5:
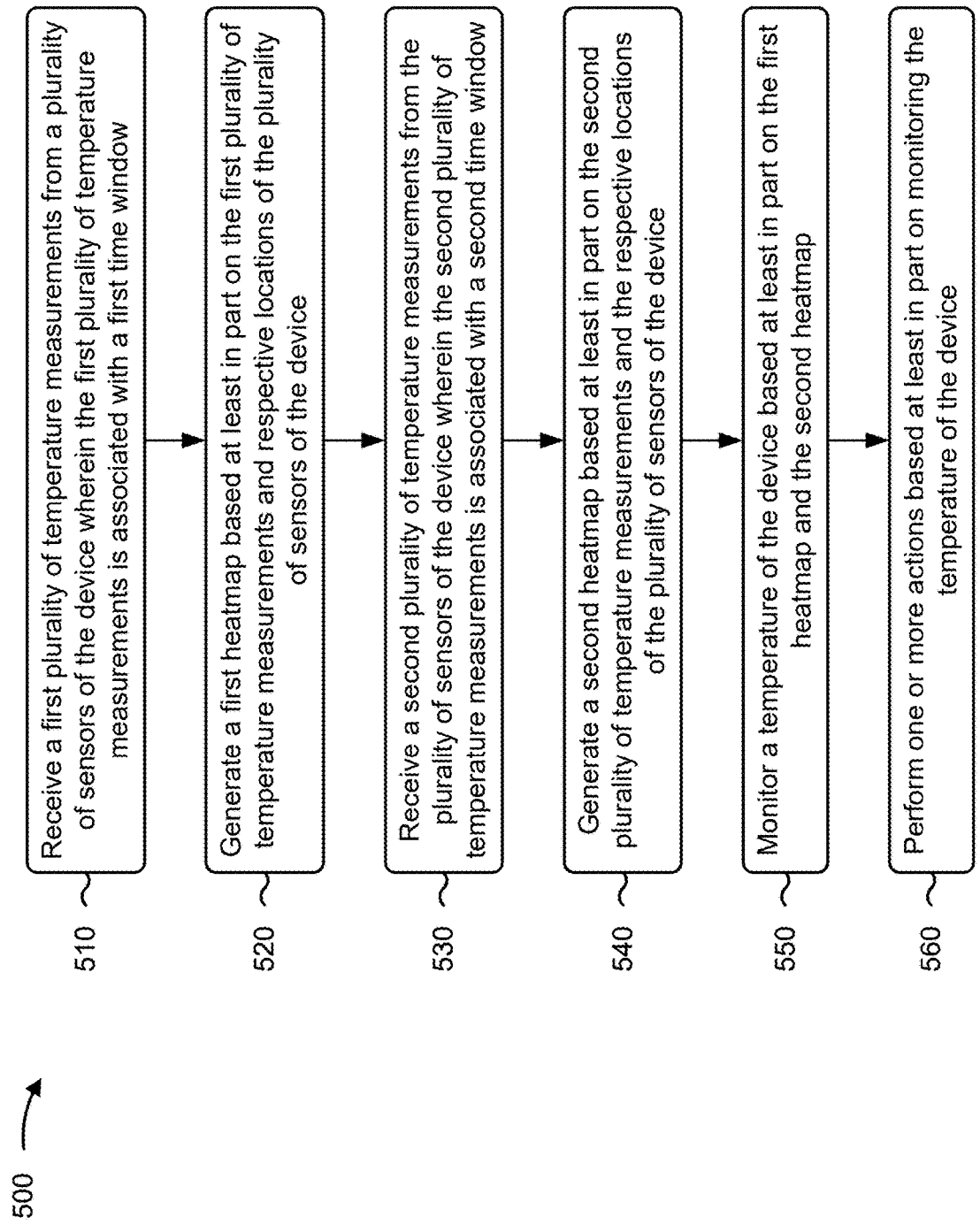
FIG. 5 is a flowchart of an example process associated with time-windowed heatmaps in mobile applications, in accordance with the present disclosure.

FIG. 5 is a flowchart of an example process 500 associated with time-windowed heatmaps in mobile applications, in accordance with the present disclosure. In some aspects, one or more process blocks of FIG. 5 are performed by a device (e.g., device 300). In some aspects, one or more process blocks of FIG. 5 are performed by another device or a group of devices separate from or including the device, such as a UE (e.g., UE 110) and/or a wireless communication device (e.g., wireless communication device 120). Additionally, or alternatively, one or more process blocks of FIG. 5 may be performed by one or more components of device 200, such as processor 210, memory 215, input component 220, output component 225, communication component 230, temperature sensor 235, first NN 240, and/or second NN 245.

As shown in FIG. 5, process 500 may include receiving a first plurality of temperature measurements from a plurality of sensors of the device, wherein the first plurality of temperature measurements is associated with a first time window (block 510). For example, the device may receive a first plurality of temperature measurements from a plurality of sensors of the device, wherein the first plurality of temperature measurements is associated with a first time window, as described above. In some aspects, the first plurality of temperature measurements is associated with a first time window.

As further shown in FIG. 5, process 500 may include generating a first heatmap based at least in part on the first plurality of temperature measurements and respective locations of the plurality of sensors of the device (block 520). For example, the device may generate a first heatmap based at least in part on the first plurality of temperature measurements and respective locations of the plurality of sensors of the device, as described above.

As further shown in FIG. 5, process 500 may include receiving a second plurality of temperature measurements from the plurality of sensors of the device, wherein the second plurality of temperature measurements is associated with a second time window (block 530). For example, the device may receive a second plurality of temperature measurements from the plurality of sensors of the device, wherein the second plurality of temperature measurements is associated with a second time window, as described above. In some aspects, the second plurality of temperature measurements is associated with a second time window.

As further shown in FIG. 5, process 500 may include generating a second heatmap based at least in part on the second plurality of temperature measurements and the respective locations of the plurality of sensors of the device (block 540). For example, the device may generate a second heatmap based at least in part on the second plurality of temperature measurements and the respective locations of the plurality of sensors of the device, as described above.

As further shown in FIG. 5, process 500 may include monitoring a temperature of the device based at least in part on the first heatmap and the second heatmap (block 550). For example, the device may monitor a temperature of the device based at least in part on the first heatmap and the second heatmap, as described above.

As further shown in FIG. 5, process 500 may include performing one or more actions based at least in part on monitoring the temperature of the device (block 560). For example, the device may perform one or more actions based at least in part on monitoring the temperature of the device, as described above.

Process 500 may include additional aspects, such as any single aspect or any combination of aspects described below and/or in connection with one or more other processes described elsewhere herein.

In a first aspect, process 500 includes predicting an occurrence of an event affecting an acceleration or a rate at which the temperature of the device changes during a third time window based at least in part on one or more of the first plurality of temperature measurements, the second plurality of temperature measurements, the first heatmap, or the second heatmap.

In a second aspect, predicting the occurrence of the event affecting the acceleration or the rate at which the temperature of the device changes during the third time window comprises utilizing one or more of a neural network, an RNN, or an HMM to predict the occurrence of the event affecting the acceleration or the rate at which the temperature of the device changes during the third time window.

In a third aspect, process 500 includes determining, based at least in part on one or more of the first heatmap or the second heatmap, a placement of one or more of a heat paste, a heatsink, or an integrated circuit.

In a fourth aspect, performing the one or more actions comprises providing a warning associated with performing one or more of a load shuffling process, a power stabilization process, or a frequency stabilization process based at least in part on monitoring the temperature of the device.

In a fifth aspect, performing the one or more actions comprises determining a workload distribution based at least in part on one or more of the first heatmap or the second heatmap.

In a sixth aspect, performing the one or more actions comprises determining a placement of a core of the device based at least in part on one or more of the first heatmap or the second heatmap.

In a seventh aspect, the first heatmap comprises a localized heatmap that is centered around a particular component or a particular area of the device.

Although FIG. 5 shows example blocks of process 500, in some aspects, process 500 includes additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a device, comprising: receiving a plurality of temperature measurements from a plurality of sensors of the device, wherein the plurality of temperature measurements indicate a temperature of one or more components of the device during a time window; determining, based at least in part on the plurality of temperature measurements, an acceleration and a rate at which the temperature of the device changes during the time window; and performing one or more actions based at least in part on the acceleration and the rate at which the temperature of the device changes during the time window.

Aspect 2: The method of Aspect 1, wherein performing the one or more actions comprises controlling one or more of a voltage, a power, or a frequency associated with the device based at least in part on the rate at which the temperature of the device changes during the time window.

Aspect 3: The method of Aspect 2, wherein the power and the frequency associated with the device are controlled by one or more of a processor of the device or a modem of the device.

Aspect 4: The method of any of Aspects 1-3, wherein the device comprises one or more of a virtual reality device or a UE.

Aspect 5: The method of any of Aspects 1-4, further comprising receiving information indicating respective locations of the plurality of sensors within a housing of the device; and generating a heatmap based at least in part on the plurality of temperature measurements and the respective locations of the plurality of sensors within the housing of the device.

Aspect 6: The method of Aspect 5, wherein the heatmap is further generated based at least in part on one or more of information indicating one or more of respective times associated with the plurality of temperature measurements, an application associated with the plurality of temperature measurements, or content associated with the plurality of temperature measurements.

Aspect 7: The method of Aspect 6, wherein the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements are provided to a GAN, and wherein the GAN generates the heatmap based at least in part on the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements.

Aspect 8: The method of Aspect 6, wherein the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements are provided to a trained neural network, and wherein the trained neural network generates the heatmap based at least in part on the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements.

Aspect 9: The method of Aspect 6, wherein generating the heatmap comprises: generating a time-based heatmap based at least in part on utilizing an RNN to process the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements.

Aspect 10: The method of Aspect 5, wherein generating the heatmap comprises generating a board-level heatmap based at least in part on merging measurements, of the plurality of temperature measurements, in two-dimensional contours for the respective locations of the plurality of sensors within the housing of the device.

Aspect 11: The method of Aspect 10, wherein generating the board-level heatmap comprises utilizing average-pooling or smooth-windowing to merge the measurements in the two-dimensional contours per the respective locations of the plurality of sensors within the housing of the device.

Aspect 12: The method of any of Aspects 1-11, wherein performing the one or more actions comprises adjusting a content associated with the plurality of temperature measurements based at least in part on the acceleration and the rate at which the temperature of the device changes during the time window.

Aspect 13: The method of any of Aspects 1-12, wherein performing the one or more actions comprises one or more of powering down one or more hardware components associated with an application or a subsystem running on the device based at least in part on the acceleration and the rate at which the temperature of the device changes during the time window, wherein the application or the subsystem is associated with the plurality of temperature measurements, or changing a power mode of the one or more hardware components based at least in part on the acceleration and the rate at which the temperature of the device changes during the time window.

Aspect 14: The method of any of Aspects 1-13, further comprising generating a thermal-value graph based at least in part on the plurality of temperature measurements, wherein the acceleration and the rate at which the temperature of the device changes during the time window are determined based at least in part on the thermal-value graph.

Aspect 15: A device configured to perform one or more operations recited in one or more of Aspects 1-14.

Aspect 16: A system configured to perform one or more operations recited in one or more of Aspects 1-14.

Aspect 17: An apparatus comprising means for performing one or more operations recited in one or more of Aspects 1-14.

Aspect 18: A non-transitory computer-readable medium storing a set of instructions, the set of instructions comprising one or more instructions that, when executed by a device, cause the device to perform one or more operations recited in one or more of Aspects 1-14.

Aspect 19: A computer program product comprising instructions or code for executing one or more operations recited in one or more of Aspects 1-14.

Aspect 20: A method of wireless communication performed by a device, comprising: receiving a first plurality of temperature measurements from a plurality of sensors of the device, wherein the first plurality of temperature measurements is associated with a first time window; generating a first heatmap based at least in part on the first plurality of temperature measurements and respective locations of the plurality of sensors of the device; receiving a second plurality of temperature measurements from the plurality of sensors of the device, wherein the second plurality of temperature measurements is associated with a second time window; generating a second heatmap based at least in part on the second plurality of temperature measurements and the respective locations of the plurality of sensors of the device; monitoring a temperature of the device based at least in part on the first heatmap and the second heatmap; and performing one or more actions based at least in part on monitoring the temperature of the device.

Aspect 21: The method of Aspect 20, further comprising predicting an occurrence of an event affecting an acceleration or a rate at which the temperature of the device changes during a third time window based at least in part on one or more of the first plurality of temperature measurements, the second plurality of temperature measurements, the first heatmap, or the second heatmap.

Aspect 22: The method of Aspect 21, wherein predicting the occurrence of the event affecting the acceleration or the rate at which the temperature of the device changes during the third time window comprises: utilizing one or more of an NN, an RNN, or an HMM to predict the occurrence of the event affecting the acceleration or the rate at which the temperature of the device changes during the third time window.

Aspect 23: The method of any of Aspects 20-22, further comprising determining, based at least in part on one or more of the first heatmap or the second heatmap, a placement of one or more of a heat paste, a heatsink, or an integrated circuit.

Aspect 24: The method of any of Aspects 20-23, wherein performing the one or more actions comprises providing a warning associated with performing one or more of a load shuffling process, a power stabilization process, or a frequency stabilization process based at least in part on monitoring the temperature of the device.

Aspect 25: The method of any of Aspects 20-24, wherein performing the one or more actions comprises determining a workload distribution based at least in part on one or more of the first heatmap or the second heatmap.

Aspect 26: The method of any of Aspects 20-25, wherein performing the one or more actions comprises determining a placement of a core of the device based at least in part on one or more of the first heatmap or the second heatmap.

Aspect 27: The method of any of Aspects 20-26, wherein the first heatmap comprises a localized heatmap that is centered around a particular component or a particular area of the device.

Aspect 28: A device configured to perform one or more operations recited in one or more of Aspects 20-27.

Aspect 29: A system configured to perform one or more operations recited in one or more of Aspects 20-27.

Aspect 30: An apparatus comprising means for performing one or more operations recited in one or more of Aspects 20-27.

Aspect 31: A non-transitory computer-readable medium storing a set of instructions, the set of instructions comprising one or more instructions that, when executed by a device, cause the device to perform one or more operations recited in one or more of Aspects 20-27.

Aspect 32: A computer program product comprising instructions or code for executing one or more operations recited in one or more of Aspects 20-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device for wireless communication, comprising:
one or more memories; and
one or more processors, coupled to the one or more memories, configured to cause the device to:
receive a plurality of temperature measurements from a plurality of sensors of the device,
wherein the plurality of temperature measurements indicate a temperature of one or more components of the device during a time window;
determine, based at least in part on the plurality of temperature measurements, an acceleration and a rate at which the temperature of the device changes during the time window; and
perform one or more actions based at least in part on the acceleration and the rate at which the temperature of the device changes during the time window.

2. The device of claim 1, wherein the one or more processors, to cause the device to perform the one or more actions, are configured to cause the device to:
control one or more of a voltage, a power, or a frequency associated with the device based at least in part on the rate at which the temperature of the device changes during the time window.

3. The device of claim 1, wherein the one or more processors are further configured to cause the device to:
generate a thermal-value graph based at least in part on the plurality of temperature measurements, wherein the acceleration and the rate at which the temperature of the device changes during the time window are determined based at least in part on the thermal-value graph.

4. The device of claim 1, wherein the device comprises one or more of a virtual reality device or a user equipment (UE).

5. The device of claim 1, wherein the one or more processors are further configured to cause the device to:
receive information indicating respective locations of the plurality of sensors within a housing of the device; and
generate a heatmap based at least in part on the plurality of temperature measurements and the respective locations of the plurality of sensors within the housing of the device.

6. The device of claim 5, wherein the heatmap is further generated based at least in part on one or more of:
information indicating one or more of respective times associated with the plurality of temperature measurements, an application associated with the plurality of temperature measurements, or content associated with the plurality of temperature measurements.

7. The device of claim 6, wherein the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements are provided to a generative artificial neural network (GAN), and
wherein the GAN generates the heatmap based at least in part on the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements.

8. The device of claim 6, wherein the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements are provided to a trained neural network, and
wherein the trained neural network generates the heatmap based at least in part on the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements.

9. The device of claim 6, wherein the one or more processors, to cause the device to generate the heatmap, are configured to cause the device to:
generate a time-based heatmap based at least in part on utilizing a recursive neural network (RNN) to process the plurality of temperature measurements, the respective locations of the plurality of sensors within the housing of the device, the one or more of the respective times associated with the plurality of temperature measurements, the application associated with the plurality of temperature measurements, or the content associated with the plurality of temperature measurements.

10. The device of claim 5 wherein the one or more processors, to cause the device to generate the heatmap, are configured to cause the device to:
generate a board-level heatmap based at least in part on merging measurements, of the plurality of temperature measurements, in two-dimensional contours for the respective locations of the plurality of sensors within the housing of the device.

11. The device of claim 10, wherein the one or more processors, to cause the device to generate the board-level heatmap, are configured to cause the device to:
utilize average-pooling or smooth-windowing to merge the measurements in the two-dimensional contours per the respective locations of the plurality of sensors within the housing of the device.

12. The device of claim 1, wherein the one or more processors, to cause the device to perform the one or more actions, are configured to cause the device to:
  adjust a content associated with the plurality of temperature measurements based at least in part on the acceleration and the rate at which the temperature of the device changes during the time window.

13. The device of claim 1, wherein the one or more processors, to cause the device to perform the one or more actions, are configured to cause the device to:
  power down one or more hardware components associated with an application or a subsystem running on the device based at least in part on the acceleration and the rate at which the temperature of the device changes during the time window,
    wherein the application or the subsystem is associated with the plurality of temperature measurements, or
  change a power mode of the one or more hardware components based at least in part on the acceleration and the rate at which the temperature of the device changes during the time window.

14. A device for wireless communication, comprising:
  one or more memories; and
  one or more processors, coupled to the one or more memories, configured to cause the device to:
    receive a first plurality of temperature measurements from a plurality of sensors of the device,
      wherein the first plurality of temperature measurements is associated with a first time window;
    generate a first heatmap based at least in part on the first plurality of temperature measurements and respective locations of the plurality of sensors of the device;
    receive a second plurality of temperature measurements from the plurality of sensors of the device,
      wherein the second plurality of temperature measurements is associated with a second time window;
    generate a second heatmap based at least in part on the second plurality of temperature measurements and the respective locations of the plurality of sensors of the device;
    monitor a temperature of the device based at least in part on the first heatmap and the second heatmap; and
    perform one or more actions based at least in part on monitoring the temperature of the device.

15. The device of claim 14, wherein the one or more processors are further configured to cause the device to:
  predict an occurrence of an event affecting an acceleration or a rate at which the temperature of the device changes during a third time window based at least in part on one or more of the first plurality of temperature measurements, the second plurality of temperature measurements, the first heatmap, or the second heatmap.

16. The device of claim 15, wherein the one or more processors, to cause the device to predict the occurrence of the event affecting the acceleration or the rate at which the temperature of the device changes during the third time window, are configured to cause the device to:
  utilize one or more of a neural network (NN), a recursive neural network (RNN), or a hidden Markov model (HMM) to predict the occurrence of the event affecting the acceleration or the rate at which the temperature of the device changes during the third time window.

17. The device of claim 14, wherein the one or more processors are further configured to cause the device to:
  determine, based at least in part on one or more of the first heatmap or the second heatmap, a placement of one or more of a heat paste, a heatsink, or an integrated circuit.

18. The device of claim 14, wherein the one or more processors, to cause the device to perform the one or more actions, are configured to cause the device to one or more of:
  provide a warning associated with performing one or more of a load shuffling process, a power stabilization process, or a frequency stabilization process based at least in part on monitoring the temperature of the device;
  determine a workload distribution based at least in part on one or more of the first heatmap or the second heatmap; or
  determine a placement of a core of the device based at least in part on one or more of the first heatmap or the second heatmap.

19. The device of claim 14, wherein the first heatmap comprises a localized heatmap that is centered around a particular component or a particular area of the device.

20. A method of wireless communication performed by a device, comprising:
  receiving a plurality of temperature measurements from a plurality of sensors of the device,
    wherein the plurality of temperature measurements indicate a temperature of one or more components of the device during a time window;
  determining, based at least in part on the plurality of temperature measurements, an acceleration and a rate at which the temperature of the device changes during the time window; and
  performing one or more actions based at least in part on the acceleration and the rate at which the temperature of the device changes during the time window.

* * * * *